(12) United States Patent
Soukup

(10) Patent No.: US 9,302,230 B2
(45) Date of Patent: Apr. 5, 2016

(54) MIXING APPARATUS AND METHOD

(71) Applicant: Slack Chemical Co., Inc., Carthage, NY (US)

(72) Inventor: Michael J. Soukup, Harrisville, NY (US)

(73) Assignee: SLACK CHEMICAL CO., INC., Carthage, NY (US)

( * ) Notice: Subject to any disclaimer, the term of this patent is extended or adjusted under 35 U.S.C. 154(b) by 0 days.

(21) Appl. No.: 14/631,581

(22) Filed: Feb. 25, 2015

(65) Prior Publication Data

US 2015/0165395 A1 Jun. 18, 2015

Related U.S. Application Data

(62) Division of application No. 13/422,785, filed on Mar. 16, 2012.

(51) Int. Cl.
*B01F 5/06* (2006.01)
*C02F 1/52* (2006.01)
*C02F 1/72* (2006.01)
*B01F 5/00* (2006.01)

(52) U.S. Cl.
CPC .............. *B01F 5/0608* (2013.01); *B01F 5/0688* (2013.01); *B01F 5/0689* (2013.01); *C02F 1/5227* (2013.01); *C02F 1/722* (2013.01); *B01F 2005/0022* (2013.01); *B01F 2215/0052* (2013.01)

(58) Field of Classification Search
CPC ... B01F 13/0059; B01F 5/0682; B01F 5/0688
USPC .............................. 366/165.2, 162.4, 336, 340
See application file for complete search history.

(56) References Cited

U.S. PATENT DOCUMENTS

| | | | |
|---|---|---|---|
| 1,441,445 A | 1/1923 | Naugle | |
| 2,758,877 A | 8/1956 | Gleason | |
| 4,068,830 A | 1/1978 | Gray | |
| 4,136,976 A | 1/1979 | Leffelman | |
| 4,352,573 A | 10/1982 | Pandolfe | |
| 4,384,789 A | 5/1983 | Avery, Jr. | |
| 4,614,440 A | 9/1986 | King | |
| 4,701,055 A * | 10/1987 | Anderson | B01F 5/00 366/336 |
| 5,137,369 A | 8/1992 | Hodan | |
| 6,722,780 B2 | 4/2004 | Stein et al. | |
| 7,281,841 B2 * | 10/2007 | Foong et al. | 366/162.4 |
| 7,621,670 B1 | 11/2009 | England et al. | |
| 2010/0265788 A1 * | 10/2010 | Kandiyeli | B01F 3/1271 366/142 |
| 2011/0305104 A1 | 12/2011 | McGuire et al. | |

* cited by examiner

*Primary Examiner* — Tony G Soohoo
*Assistant Examiner* — Anshu Bhatia
(74) *Attorney, Agent, or Firm* — Heslin Rothenberg Farley & Mesiti P.C.

(57) ABSTRACT

A mixing apparatus includes a housing having an inner chamber, an inlet, and an outlet; an outlet conduit having a first and second end, the second end providing communication between the inner chamber and the outlet; and one or more dispersion members configured to mix one or more fluids, the one or more dispersion members extending between the outlet conduit and the housing. The dispersion members include a plate having a first and second side, a first opening in the plate for receiving an outlet conduit of the mixing device, and a plurality of second openings in the plate. The plurality of second openings has a first and second side. The first and second sides of the plurality of second openings have chamfered edges.

18 Claims, 7 Drawing Sheets

MIXING APPARATUS AND METHOD

CROSS REFERENCE TO RELATED APPLICATIONS

This application is a divisional of U.S. application Ser. No. 13/422,785 filed Mar. 16, 2012, which is hereby incorporated herein by reference in its entirety.

TECHNICAL FIELD

The present disclosure relates generally to a mixing apparatus, and more particularly, to mixing and diluting chemicals for the water and wastewater treatment industry, as well as, a mixer for the addition of a chemical solution to water flows for water treatment, for example, in individual residential water systems.

BACKGROUND

Currently available mixing devices, some of which use an impeller style mixer, may cause shearing or breaking of polymer chains in the chemicals being diluted or mixed by the mixing device. In addition, the currently used mixing devices may fail to allow the polymer chains to fully open before the mixed and diluted chemical is used. If the polymer chains of a chemical are sheared, broken, or not fully open prior to introduction into the process in which they are being used, then the diluted chemical will not be as effective.

The present disclosure contemplates a new and improved mixing apparatus and method that overcome the current limitations.

SUMMARY

In one aspect provided herein, is a novel mixing apparatus including a housing, an outlet conduit, and one or more dispersion plates. The housing has an inner chamber, an inlet, and an outlet. The outlet conduit has a first end and a second end and the second end of the outlet conduit providing fluid communication between the housing's inner chamber and the outlet. The one or more dispersion plates are configured to mix one or more fluids and the one or more dispersion plates extend between the outlet conduit and the housing.

In another aspect provided herein, is a dispersion plate of a mixing apparatus. The dispersion plate includes a plate having a first side and a second side, a first opening in the plate, and a plurality of second openings in the plate. The first opening is for receiving an outlet conduit of the mixing device. The plurality of second openings has a first side and a second side and the first and second sides have chamfered edges.

In yet another aspect of the present invention provided herein, is a method of mixing and diluting a concentrated fluid in a mixing device. The method includes delivering the concentrated fluid into a stream of dilution fluid outside a housing of the mixing device. The concentrated fluid and the dilution fluid are supplied into the housing through an inlet. The concentrated fluid and the dilution fluid are mixed in an inner chamber of the housing, wherein the mixing includes passing the concentrated fluid and the dilution fluid through a plurality of first openings in one or more dispersion members in the inner chamber of the housing to blend the concentrated fluid and the dilution fluid to form a mixed fluid. The mixed fluid is discharged through an outlet conduit from the inner chamber of the housing to an outlet of the housing, wherein a pressure of the concentrated fluid and the dilution fluid at the inlet forces the mixed fluid out of the housing through the outlet conduit and the outlet.

These, and other embodiments, objects, features and advantages of this invention will become apparent from the following detailed description of the various aspects of the invention taken in conjunction with the accompanying drawings and are considered a part of the claimed invention.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention.

DETAILED DESCRIPTION

Figure 1:
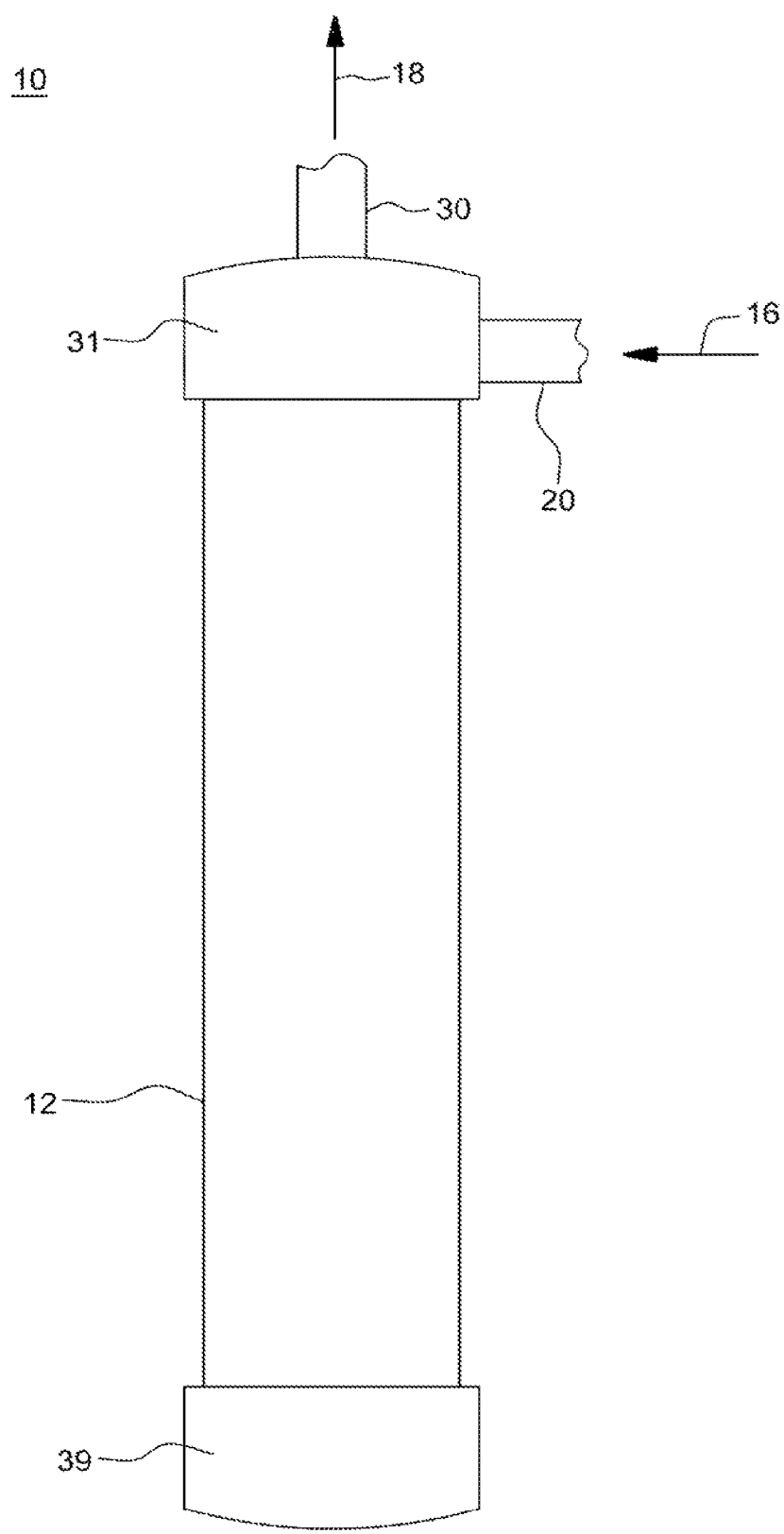
FIG. 1 is a side view of a mixing apparatus, in accordance with one or more aspects of the present invention.
Figure 2:
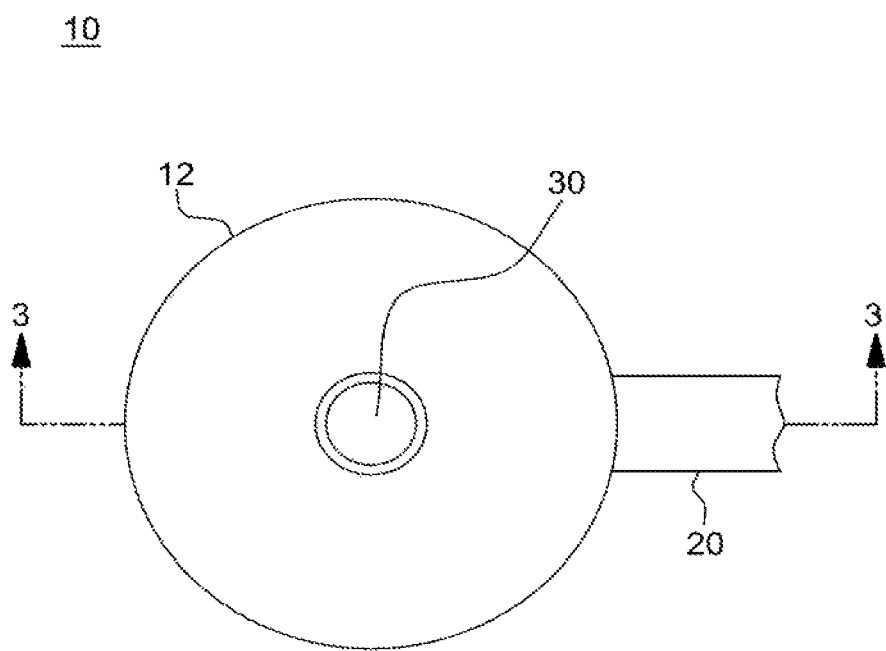
FIG. 2 is a top view of the mixing apparatus of FIG. 1, in accordance with one or more aspects of the present invention.
Figure 3:
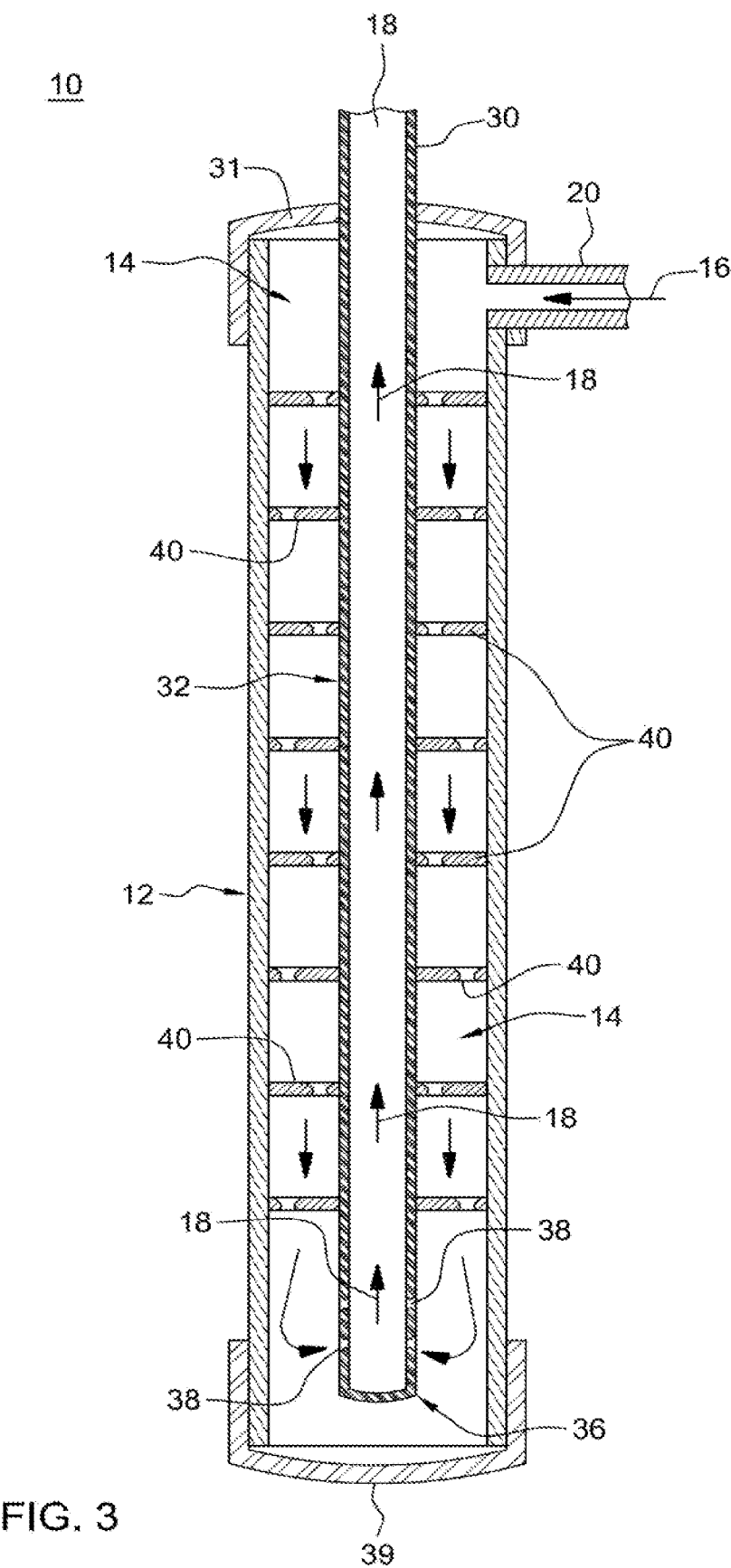
FIG. 3 is a cross-sectional view of the mixing apparatus taken along line 3-3 in FIG. 2, in accordance with one or more aspects of the present invention.

Referring to the drawings, wherein like reference numerals are used to indicate like or analogous components or steps throughout the several views, and with particular reference to FIGS. 1-3, there is illustrated an exemplary mixing apparatus 10. As best seen in FIGS. 1-3, mixing apparatus 10 includes a housing 12 having an inner chamber 14, an outlet conduit 32, an inlet 20, an outlet 30, and one or more dispersion plates 40. The housing 12, inner chamber 14, and outlet conduit 32 are illustrated as cylindrical tubes in the depicted embodiments, however alternative shapes are contemplated. In the depicted embodiment the inlet 20 is on a side (e.g., axial or longitudinal side) of housing 12 near a top 31 of housing 12 and outlet 30 is on the top 31 of housing 12, although other arrangements have been contemplated. Referring now to FIG. 3, the one or more dispersion plates 40 are evenly spaced apart along the inner chamber 32 and extend (e.g., substantially perpendicular) between the housing 12 and the outlet conduit 32. The bottom of the outlet conduit 32 is spaced apart from a bottom 39 of inner chamber 14 and extends from bottom 39 of inner chamber 32 of housing 12 and out of top 31 of inner chamber 32 of housing 12 by outlet 30. The outlet conduit 32 may have a cap 36 on bottom 39 of outlet conduit 32.

Figure 4:
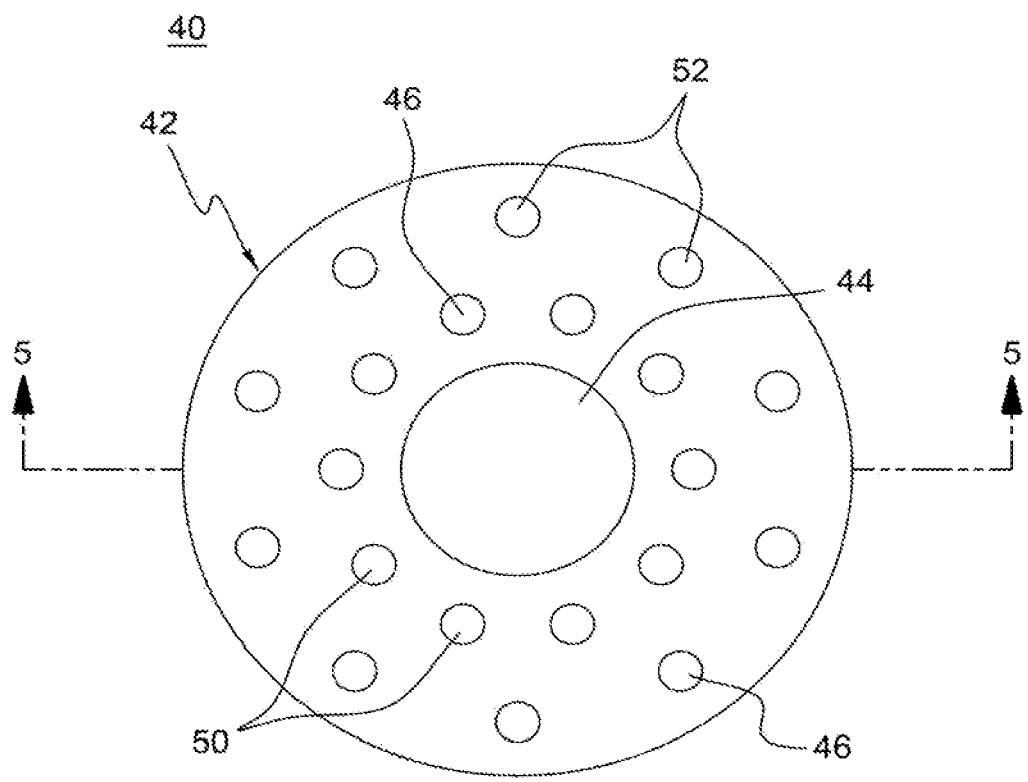
FIG. 4 is a top view of a dispersion plate in the mixing apparatus of FIGS. 1-3, in accordance with one or more aspects of the present invention.
Figure 5:
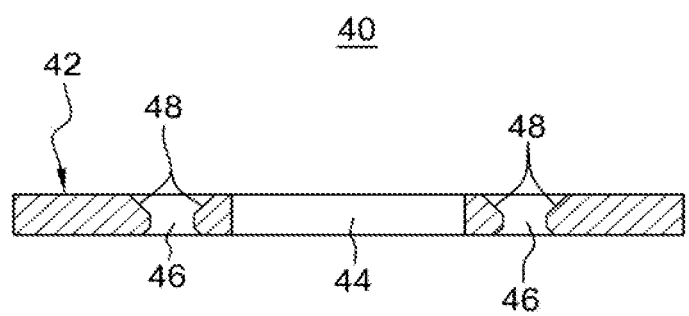
FIG. 5 is a cross-sectional view of the dispersion plate of FIG. 4 taken along line 5-5 in FIG. 4, in accordance with one or more aspects of the present invention.

FIGS. 4 and 5 illustrate dispersion members 40. As best seen in FIG. 4, dispersion plates 40 have a plate 42, a first opening 44, and a plurality of second openings 46. The first opening 44 may be of a size and shaped to fit around the outer circumference of outlet conduit 32 and inhibit the flow of inlet fluid 16 between first opening 44 and the outside of outlet conduit 32 (e.g., if the outlet conduit 32 is a 1" pipe having an outer diameter of 1.315" then the first opening 44 would be machined to about 1.320" in diameter). In the illustrated embodiment, the outer circumference of dispersion plates 40 engages the inner circumference of housing 12 and inhibits the flow of inlet fluid 16 between the inner circumference of housing 12 and the outer circumference of dispersion plates 40. In the depicted embodiment, plurality of openings 46 are located across plate 42 in two rings, an inner ring 50 and an outer ring 52. Other configurations for plurality of openings 46 across plate 42 are also contemplated. As illustrated in the depicted embodiment plurality of openings 46 has twenty openings and the twenty openings each have a diameter of about ¼". It is also contemplated that plurality of openings 46 may range from about 10 to 50 and the diameter of the openings would vary with number of openings such that the more openings the smaller the diameter and the fewer openings the larger the diameter. Although plurality of openings 46 are shown as round, other shapes are also contemplated.

As depicted in FIG. 5, plurality of openings 46 are bounded by chamfered edges 48 on both sides of plate 42. The angles of chamfered edges 48 may range from about 30 degrees to 60 degrees. Preferably the angles of chamfered edges 48 on both sides of plate 42 are about 45 degrees to reduce the possibility of shearing the polymers in the chemicals being mixed and diluted. The angles of chamfered edges 48 are described in greater detail hereinafter. In addition, chamfered edges 48 create a current in the fluids within inner chamber 14 to induce mixing of the chemical within the dilution fluid which enables full activation of the polymers in the chemical. The current in the fluids is formed by a vortex that is created within, and immediately adjacent to, plurality of openings 46 as the fluids pass through dispersion plates 40. It is also contemplated that only the top side 54 of plate 42 has chamfered edges and the chamfered top edges may range from about 30 to 60 degrees. The angle for chamfered edges 48 on only the top side 54 of plate 42 may preferably be 45 degrees. It is further contemplated that only the bottom side 56 of plate 42 has chamfered edges and the chamfered bottom edges may range from about 30 to 60 degrees. The angle for chamfered edges 48 on only the bottom side 56 of plate 42 may preferably be 45 degrees.

Figure 6:
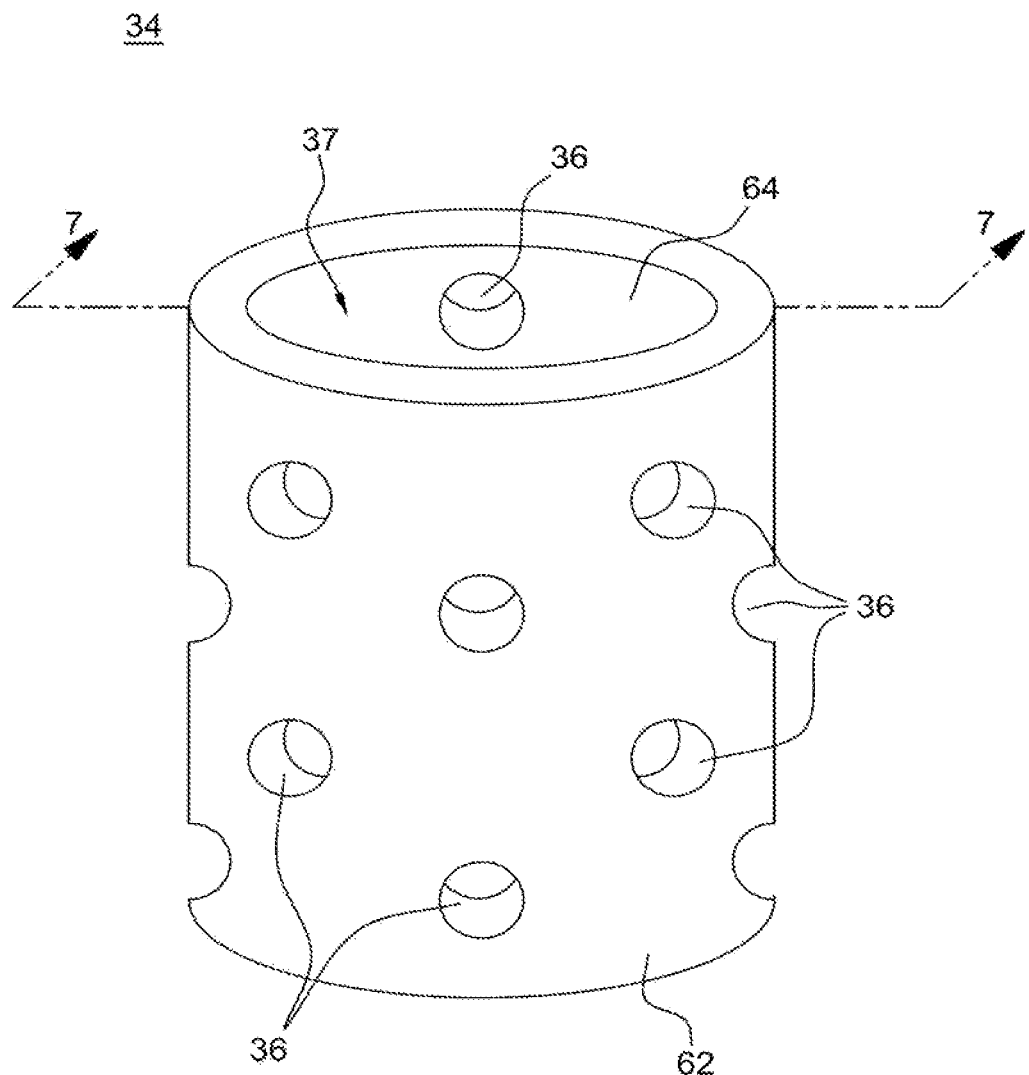
FIG. 6 is a perspective view of a cap, in accordance with one or more aspects of the present invention.
Figure 7:
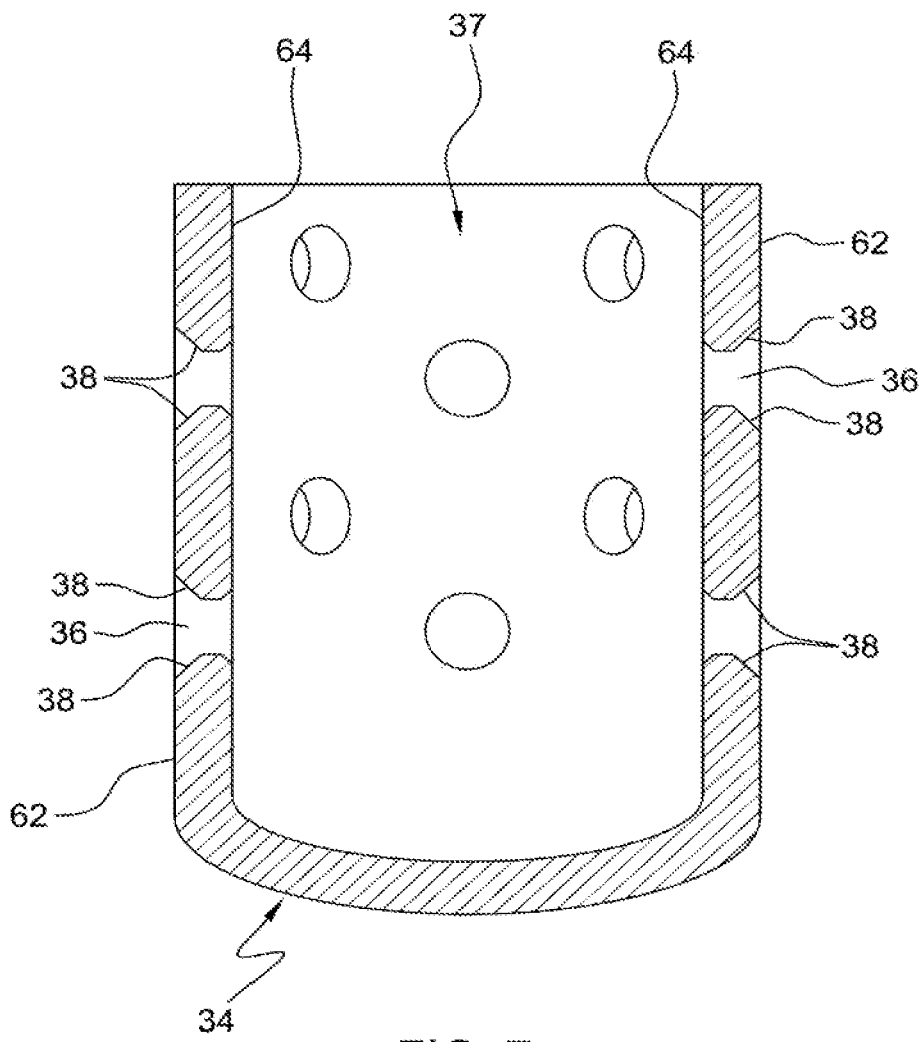
FIG. 7 is a cross-section view of the cap of FIG. 6 taken along line 7-7 in FIG. 6, in accordance with one or more aspects of the present invention.

As illustrated in FIGS. 6 and 7, a cap 34 may include one or more openings 36, which a fluid 16 passes through to enter outlet conduit 32, and a second opening 37. The second opening 37 provides the attachment means for securing cap 34 to outlet conduit 32. The cap 34 may be secured to outlet conduit 32 at second opening 37 by attachment means know in the art (e.g., with an adhesive, such as polyvinyl chloride cement). In the illustrated embodiment, the one or more openings 36 are located equally spaced apart around the outer surface of cap 34. It is also contemplated that one or more openings 36 may be located anywhere on cap 34, including a bottom 39 of cap 34. Referring now to FIG. 7, one or more openings 36 in cap 34 may have chamfered edges 38 to reduce the possibility of shearing the polymers in the chemicals being mixed and diluted. The angles of chamfered edges 38 may range from about 30 degrees to 60 degrees. Preferably the angles of chamfered edges 38 on both sides of cap 34 are about 45 degrees. The angles of chamfered edges 38 are described in greater detail hereinafter. The cap 34 is a cylinder in the illustrated embodiments, however other shapes are also contemplated.

Figure 8:
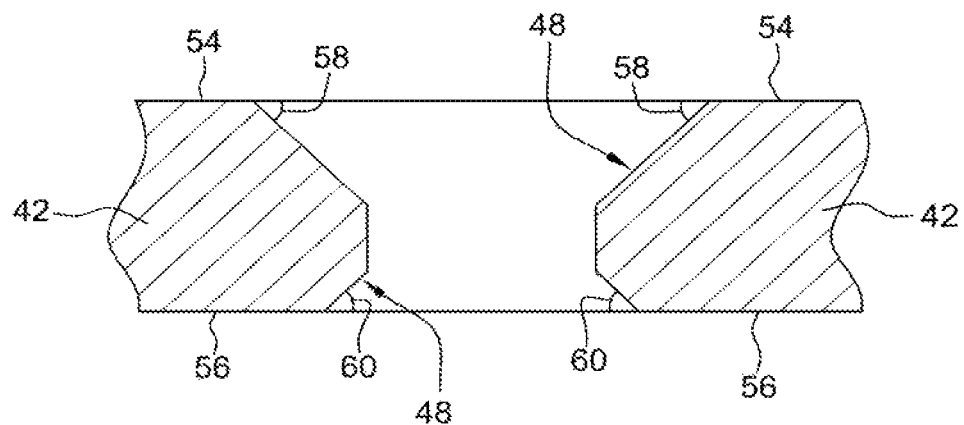
FIG. 8 is an enlarged cross-section view of one chamfered opening in the dispersion plate of FIGS. 4-5, in accordance with one or more aspects of the present invention.
Figure 9:
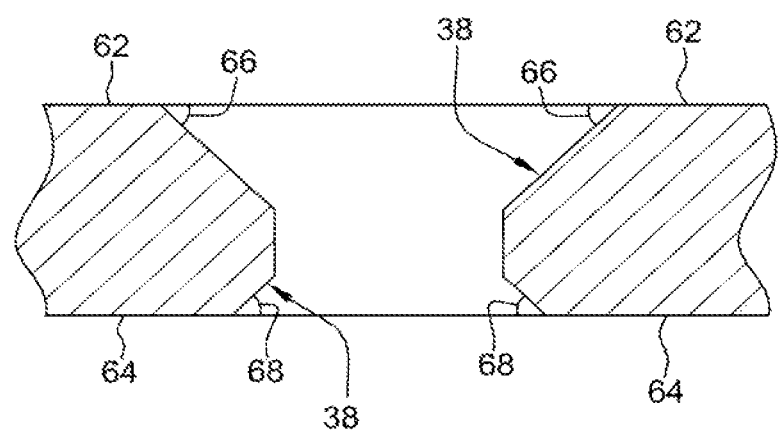
FIG. 9 is an enlarged cross-section view of one chamfered opening in the cap of FIGS. 6-7, in accordance with one or more aspects of the present invention.

As best seen in FIG. 8, the angles of chamfered edges 48 of dispersion plates 42 are created relative to a top side 54 of dispersion plates 42 and a bottom side 56 of dispersion plates 42. An angle 58 is created relative to top side 54 of and into dispersion plates 42 and may range from about 30 degrees to 60 degrees. Preferably angle 58 is about 45 degrees. An angle 60 is created relative to the bottom side 56 of and into dispersion plates 42 and may range from about 30 degrees to 60 degrees. Preferably angle 60 is about 45 degrees. Referring now to FIG. 9, the angles of chamfered edges 38 of cap 34 are created relative to an outer surface 62 of cap 34 and an inner surface 64 of cap 34. An angle 66 is created relative to outer surface 62 of and into cap 34 and may range from about 30 degrees to 60 degrees. Preferably angle 66 is about 45 degrees. An angle 68 is created relative to the inside surface 64 of and into cap 34 and may range from about 30 to 60 degrees. Preferably angle 68 is about 45 degrees.

Referring now to FIGS. 1-9, a chemical is injected or otherwise added to a dilution fluid prior to entering mixing apparatus 10. Although not described above, the chemical mixed with the dilution fluid per the method now being described could be, for example, polymer emulsions. The dilution fluid is typically water, but other dilution fluids known in the art may also be used. Once the chemical is injected into the dilution fluid, a blended fluid 16 is created. The blended fluid 16 flows into housing 12 under pressure (e.g., generally the pressure of the water entering the system which is typically "street" pressure of about 50-70 psi and should not exceed about 100 psi due to the construction materials) of mixing apparatus 10 at inlet 20. As blended fluid 16 enters housing 12 the blended fluid 16 flows into inner chamber 14 and fills inner chamber 14 around outlet conduit 32. As blended fluid 16 continues to fill inner chamber 14 the pressure from blended fluid 16 entering housing 12 at inlet 20 forces blended fluid 16 to flow through plurality of openings 46 in one or more dispersion plates 40. In the depicted embodiment, eight dispersion plates 40 are shown, although other numbers of dispersion plates 40 are also contemplated.

The plurality of openings 46 in each adjacent dispersion plate 40 are offset (e.g., axially or longitudinally relative to housing 12) from plurality of openings 46 in the prior dispersion plate 40 to inhibit blended fluid 16 from flowing straight down through plurality of openings 46 in each of dispersion plates 40 without inducing any mixing. As blended fluid 16 flows through each of the offset dispersion plates 40, blended fluid 16 flows through the plurality of openings 46 of one of dispersion plates 40 then contacts the surface of the subsequent dispersion plate 40 changing the flow pattern of blended fluid 16 and creating a current or flow to mix blended fluid 16. As blended fluid 16 passes through each of dispersion plates 40 the current created by blended fluid 16 interacting with dispersion plates 40 induces additional mixing of blended fluid 16.

After blended fluid 16 passes through each of dispersion plates 40 and reaches bottom 39 of inner chamber 14, blended fluid 16 then may pass through one or more openings 36 in cap 34 to enter outlet conduit 32. Once blended fluid 16 enters cap 34 and outlet conduit 32 mixing by dispersion plates 40 is substantially completed and blended fluid 16 is now mixed and diluted creating an outlet fluid 18. Outlet fluid 18 travels up through outlet conduit 32 due to the pressure of the fluids entering at inlet 20. Outlet fluid 18 then passes out of housing 12 at outlet 30 and is ready for use. The mixed and diluted outlet fluid 18 may be used for wastewater treatment, such as in the dewatering processes. For example, the dewatering process may mix outlet fluid 18 with wastewater sludge to encourage coagulation, flocculation, and separation of solids from the sludge water. As the water pressure of the fluids at inlet 20 provides the necessary pressure to move and mix blended fluid 16 and outlet fluid 18 through mixing apparatus 10, mixing apparatus 10 does not require additional energy to mix the chemicals and dilution fluid and no moving parts are needed for the mixing process. The flow rate of the fluids at inlet 20 may be controlled by a valve which in turn controls the pressure exerted on the fluids as they pass through mixing apparatus 10.

Alternatively, mixing apparatus 10 could be used in individual residential water systems to remove contaminants, for example sulfur or water hardness, from the water before it is dispersed throughout the residence for use. The incoming water would be mixed with a chemical, such as hydrogen peroxide, to form blended fluid 16 as described above. As the blended fluid 16 passes through dispersion plates 40, as described above, the chemical oxidizes the contaminants in the water thereby removing the contaminants before the water is dispersed throughout the home for use. Once the blended fluid 16 has reached the bottom 39 of inner chamber 14 it enters cap 34 and creates outlet fluid 18, as described above, which then exits through outlet conduit 32 at outlet 30 and may then pass into the pipes of the residence for distribution as needed.

The invention has been described with reference to the preferred embodiments as well as several alternative embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

The invention claimed is:

1. A method of mixing and diluting a concentrated fluid in a mixing device, the method comprising:
    delivering the concentrated fluid into a stream of dilution fluid outside a housing of the mixing device, wherein the concentrated fluid comprises a plurality of polymers;
    supplying the concentrated fluid and the dilution fluid into the housing through an inlet;
    mixing the concentrated fluid and the dilution fluid in an inner chamber of the housing, wherein the mixing comprises:
        passing the concentrated fluid and the dilution fluid through a plurality of openings in one or more dispersion members in the inner chamber of the housing to blend the concentrated fluid and the dilution fluid to form a mixed fluid; and
        passing the concentrated fluid and the dilution fluid over a chamfered surface bounding a first opening to the plurality of openings to inhibit shearing of the plurality of polymers in the mixed fluid;
    discharging the mixed fluid through an outlet conduit from the inner chamber of the housing to an outlet of the housing, wherein a pressure of the concentrated fluid and the dilution fluid at the inlet forces the mixed fluid out of the housing through the outlet conduit and the outlet; and
    flowing the mixed fluid through a plurality of openings in a cap on an end of the outlet conduit in the inner chamber.

2. The method of claim 1, wherein mixing the concentrated fluid and the dilution fluid further comprises:
    passing the concentrated fluid and the dilution fluid through a plurality of openings in at least two dispersion members of the one or more dispersion members, wherein the plurality of openings in adjacent dispersion members of the at least two dispersion members are offset axially.

3. The method of claim 1, wherein mixing the concentrated fluid and the dilution fluid further comprises:
    contacting a top surface of the one or more dispersion members to change a flow pattern of the concentrated fluid and the dilution fluid to create a current to mix the concentrated fluid and the dilution fluid to form the mixed fluid.

4. The method of claim 1, wherein the outlet conduit of the mixing device has a first end and a second end, the second end of the outlet conduit providing fluid communication between the inner chamber of the housing and the outlet and wherein the one or more dispersion members extend between the outlet conduit and the housing.

5. The method of claim 4, wherein the mixing device further comprises:
    the cap substantially enclosing the first end of the outlet conduit with respect to the inner chamber of the housing and the plurality of openings extending through the cap and the plurality of openings of the cap having chamfered edges.

6. The method of claim 5, wherein the mixed fluid passes from the inner chamber through the plurality of openings in the cap and into the outlet conduit.

7. The method of claim 1, wherein the mixed fluid is used for wastewater treatment.

8. The method of claim 1, wherein the mixing device is used in a residential water system to remove contaminants from water before dispersing the water through a home.

9. A method of mixing and diluting a concentrated fluid in a mixing device, the method comprising:
    delivering the concentrated fluid into a stream of dilution fluid flowing into the mixing device to form a blended fluid, wherein the mixing device comprises:
        a housing with an inner chamber, an inlet, and an outlet;
        an outlet conduit with a first end and a second end, the first end forming the outlet and the second end positioned within the inner chamber of the housing;
        one or more dispersion members extending between the outlet conduit and the housing; and
        a cap substantially enclosing the first end of the outlet conduit with respect to the inner chamber of the housing;
    supplying the blended fluid into the housing through the inlet;
    mixing the blended fluid in the inner chamber of the housing, wherein the mixing comprises passing the blended fluid through a plurality of openings in the one or more dispersion members in the inner chamber of the housing to mix the blended fluid to form a mixed fluid; and
    discharging the mixed fluid from the inner chamber of the housing through the cap and the outlet conduit to the outlet of the housing, wherein a pressure of the blended fluid at the inlet forces the mixed fluid out of the housing through the outlet conduit and the outlet.

10. The method of claim 9, wherein the one or more dispersion members comprises:
    at least one first dispersion member with a plurality of first openings; and at least one second dispersion member with a plurality of second openings for the blended fluid to flow through.

11. The method of claim 10, wherein the at least one first dispersion member is positioned above the at least one second dispersion member and the plurality of first openings are offset from the plurality of second openings along a longitudinal axis of the mixing device.

12. The method of claim 11, wherein mixing the blended fluid further comprises:
   passing the blended fluid through the plurality of first openings in a first of the at least one first dispersion members and then through the plurality of second openings in a first of the at least one second dispersion members to form the mixed fluid.

13. The method of claim 12, wherein at least one of a first side and a second side of the plurality of first openings in the at least one first dispersion member is chamfered and at least one of a first side and a second side of the plurality of second openings in the at least one second dispersion member is chamfered to inhibit shearing of a plurality of polymers in the blended fluid.

14. The method of claim 9, wherein mixing the blended fluid further comprises:
   contacting a top surface of the one or more dispersion members to change a flow pattern of the blended fluid to create a current to mix the blended fluid to form the mixed fluid.

15. The method of claim 9, wherein the outlet conduit of the mixing device has a first end and a second end, the second end of the outlet conduit providing fluid communication between the inner chamber of the housing and the outlet and wherein the one or more dispersion members extend between the outlet conduit and the housing.

16. The method of claim 15, wherein the cap comprises:
   one or more openings extending therethrough and the one or more openings each having at least one chamfered edge to inhibit shearing of a plurality of polymers in the blended fluid.

17. The method of claim 16, wherein the method further comprises:
   flowing the mixed fluid from the inner chamber through the one or more openings in the cap, into the outlet conduit, and out of the outlet.

18. The method of claim 15, wherein the chamfered edge of the one or more openings in the cap are on an exterior surface of the cap.

* * * * *